(12) United States Patent
Gao et al.

(10) Patent No.: US 11,578,741 B2
(45) Date of Patent: Feb. 14, 2023

(54) FASTENER

(71) Applicant: HILTI AKTIENGESELLSCHAFT, Schaan (LI)

(72) Inventors: Leo Gao, Shanghai (CN); Mathias Goldt, Shanghai (CN)

(73) Assignee: HILTI AKTIENGESELLSCHAFT, Schaan (LI)

( * ) Notice: Subject to any disclaimer, the term of this patent is extended or adjusted under 35 U.S.C. 154(b) by 341 days.

(21) Appl. No.: 16/648,778

(22) PCT Filed: Sep. 20, 2018

(86) PCT No.: PCT/EP2018/075518
§ 371 (c)(1),
(2) Date: Mar. 19, 2020

(87) PCT Pub. No.: WO2019/057841
PCT Pub. Date: Mar. 28, 2019

(65) Prior Publication Data
US 2020/0284279 A1 Sep. 10, 2020

(30) Foreign Application Priority Data
Sep. 21, 2017 (CN) .......................... 201710855920.5
Sep. 21, 2017 (CN) .......................... 201721215426.4

(51) Int. Cl.
*F16B 39/10* (2006.01)
*F16B 5/02* (2006.01)
(Continued)

(52) U.S. Cl.
CPC .................. *F16B 5/02* (2013.01); *E03F 5/06* (2013.01); *E04C 2/428* (2013.01); *F16B 5/121* (2013.01); *F16B 37/043* (2013.01); *F16B 37/044* (2013.01)

(58) Field of Classification Search
CPC .............................. F16B 37/043; F16B 5/121
(Continued)

(56) References Cited

U.S. PATENT DOCUMENTS 2,467,877 A * 4/1949 Barry ........................ F16B 2/12
52/507
4,180,343 A * 12/1979 Finlay ..................... E04F 19/10
403/387
(Continued)

FOREIGN PATENT DOCUMENTS

| CN | 102345659 A | 2/2012 |
| CN | 104641053 A | 5/2015 |

(Continued)

OTHER PUBLICATIONS

International Bureau, International Search Report in International Application No. PCT/EP2018/075518, dated Dec. 17, 2018.

*Primary Examiner* — Gary W Estremsky
(74) *Attorney, Agent, or Firm* — Leydig, Voit & Mayer, Ltd.

(57) ABSTRACT

A fastener, includes a first clip member having a first base portion and two first arm portions that extend upwardly from two sides of the first base portion, a second clip member locked with the first clip member and having a second base portion and two second arm portions that extend upwardly from two sides of the second base portion, and at least one hook portion extending from a distal end of one of the first and second arm portions, wherein the first and second clip members are arranged horizontally along two different directions, the second base portion is positioned on the first base portion.

19 Claims, 7 Drawing Sheets

(51) Int. Cl.
*E03F 5/06* (2006.01)
*E04C 2/42* (2006.01)
*F16B 5/12* (2006.01)
*F16B 37/04* (2006.01)

(58) Field of Classification Search
USPC .................. 24/295; 52/507, 512; 411/123
See application file for complete search history.

(56) References Cited

U.S. PATENT DOCUMENTS

| | | | | |
|---|---|---|---|---|
| 4,362,422 | A * | 12/1982 | Zinkann | .............. F16B 2/12 |
| | | | | 403/387 |
| 5,118,147 | A * | 6/1992 | Correll | ............... E04C 2/428 |
| | | | | 403/387 |
| 5,271,195 | A * | 12/1993 | Wahe | ................. E04F 19/10 |
| | | | | 49/55 |
| 5,997,341 | A | 12/1999 | Ushiyama et al. | |
| 7,226,260 | B2 | 6/2007 | Jackson, Jr. et al. | |
| 8,316,513 | B2 * | 11/2012 | DeJong | ............. F16B 5/065 |
| | | | | 24/294 |
| 8,794,895 | B2 | 8/2014 | Homner et al. | |
| 8,944,733 | B2 * | 2/2015 | Podsadny | ........... F16B 21/075 |
| | | | | 24/295 |
| 9,353,522 | B2 | 5/2016 | Bergman et al. | |
| 9,376,813 | B2 | 6/2016 | Bergman et al. | |
| 9,874,013 | B2 | 1/2018 | Bergman et al. | |
| 10,072,687 | B2 | 9/2018 | Jiang | |
| 2004/0244156 | A1 | 12/2004 | Jackson, Jr. et al. | |
| 2005/0271492 | A1 * | 12/2005 | Jackson, Jr. | .......... F16B 21/076 |
| | | | | 411/112 |
| 2015/0211231 | A1 | 7/2015 | Bergman et al. | |
| 2015/0300016 | A1 | 10/2015 | Bergman et al. | |
| 2015/0314814 | A1 * | 11/2015 | Pulleyblank | ........... B62D 33/02 |
| | | | | 296/183.1 |
| 2016/0233820 | A1 * | 8/2016 | Redel | ...................... F16B 7/187 |
| 2016/0273219 | A1 | 9/2016 | Bergman et al. | |
| 2018/0119982 | A1 * | 5/2018 | Waters, Jr. | ............. F16M 13/02 |
| 2018/0209132 | A1 * | 7/2018 | Dian | ..................... E01C 11/227 |
| 2019/0144801 | A1 * | 5/2019 | Bettiol | ..................... C11D 1/94 |
| | | | | 510/235 |
| 2020/0284279 | A1 | 9/2020 | Gao et al. | |
| 2020/0340245 | A1 | 10/2020 | Bergman et al. | |

FOREIGN PATENT DOCUMENTS

| | | |
|---|---|---|
| CN | 204493381 U | 7/2015 |
| CN | 105952737 A | 9/2016 |
| CN | 207297600 U | 5/2018 |
| CN | 109538618 A | 3/2019 |
| JP | 2008-542645 A | 11/2008 |
| JP | 2014-34872 A | 2/2014 |
| KR | 10-0707497 B1 | 4/2007 |
| KR | 10-2013-0134185 A | 12/2013 |
| KR | 101467161 B1 | 12/2014 |

* cited by examiner

FIG. 1

(Prior Art)

FASTENER

CROSS-REFERENCE TO RELATED APPLICATIONS

This patent application is the U.S. National Stage of International Patent Application No. PCT/EP2018/075518, filed Sep. 20, 2018, which claims the benefit of Chinese Patent Application No. 201710855920.5, filed Sep. 21, 2017, and Chinese Patent Application No. 201721215426.4, filed Sep. 21, 2017, which are each incorporated by reference.

FIELD OF THE INVENTION

The present invention relates to a fastener and, more particularly, to a fastener for fixing grating panels.

BACKGROUND OF THE INVENTION

Grating panels are often used in forming structural walkways, which requires to be properly positioned in place and secured to a support underneath the grating panels.

Figure 1:
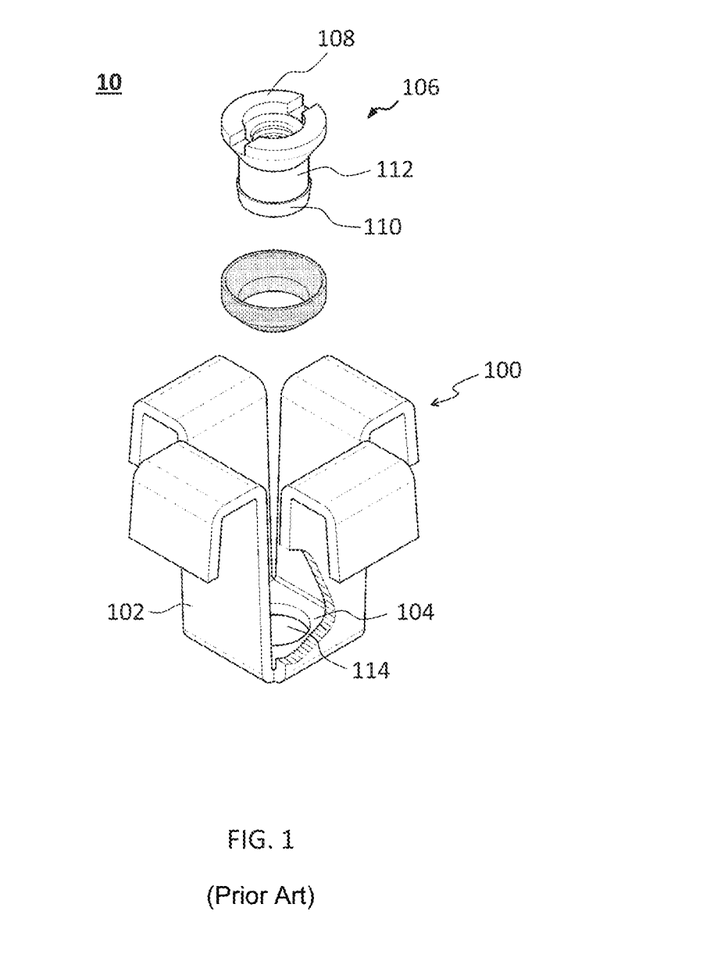
FIG. 1 is a schematic exploded view of a conventional fastener.

FIG. 1 shows a conventional fastener 10 for fixing a grating panel on a support, disclosed in Patent No. KR101467161B1. The fastener 10 includes a clip 100 that has arms 102 respectively extending from four sides of a bottom portion 104. However, since each arm 102 is isolated from adjacent arms of the clip 100, deformation of the clip 100 is likely to occur when a shear load is applied to one arm towards an opposite arm. In addition, the clip 100 is formed based on a cross-shaped piece, which brings problems of material waste or complexity of laying out a plurality of cross-shaped pieces in a large sheet material. The fastener 10 further includes an adapter 106 functioning as a nut element. To keep the adapter 106 within the fastener 10, the diameters of two ends 108 and 110 of the adapter 106 have to be larger than the diameter of a body portion 112, and additional process is required to press the adapter 106 into a through hole 114 of the clip 100. Accordingly, it would be advantageous to have an alternative fastener for fixing the grating panel on the support.

BRIEF SUMMARY OF THE INVENTION

In one embodiment, the present invention provides a fastener. The fastener includes a first clip member having a first base portion and two first arm portions that extend upwardly from two sides of the first base portion, a second clip member locked with the first clip member and having a second base portion and two second arm portions that extend upwardly from two sides of the second base portion, and at least one hook portion extending from a distal end of one of the first and second arm portions. The first and second clip members are arranged horizontally along two different directions, the second base portion is positioned on the first base portion.

BRIEF DESCRIPTION OF THE SEVERAL VIEWS OF THE DRAWING(S)

The invention, together with objects and advantages thereof, may best be understood by reference to the following description of preferred embodiments together with the accompanying drawings in which.

DETAILED DESCRIPTION OF THE INVENTION

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

Figure 2:
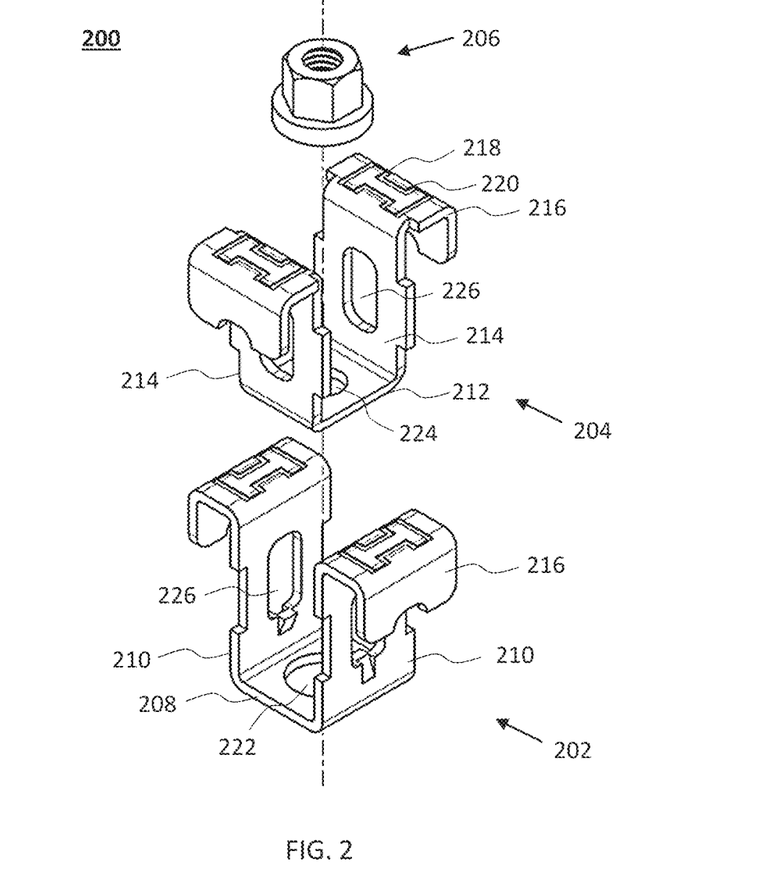
FIG. 2 is a schematic exploded, perspective view of a fastener for fixing grating panels in accordance with an embodiment of the present invention.

Referring now to FIG. 2, a schematic exploded, perspective view of a fastener 200 for fixing a grating panel on a support in accordance with an embodiment of the present invention is shown. The fastener 200 comprises a first clip member 202 and a second clip member 204. The fastener 200 preferably further comprises a fastening element 206, or other fastening element, for example, a standard bolt, wherein the second clip member 204 is sandwiched between the first clip element 202 and the fastening element 206. The first clip member 202 comprises a first base portion 208 and two first arm portions 210 extending upwardly from two sides of the first base portion 208. Similarly, the second clip member 204 comprises a second base portion 212 and two second arm portions 214 extending upwardly from two sides of the second base portion 212. Each of the first and second clip members 202 and 204 further comprises two hook portions 216 extending from distal ends of the corresponding first or second arm portions 210 or 214. Each hook portion 216 is bent or rolled downwardly for receiving a bar of the grating panel (not shown). In a preferred embodiment, the hook portion 216 comprises at least a groove 218 or a ridge 220 formed on a top surface thereof for anti-slippery purpose.

The first and second base portions 208 and 212 respectively comprises first and second through holes 222 and 224 formed therein. The second base portion 212 is mounted over the first base portion 208, wherein the first and second through holes 222 and 224 are at least partially overlapped. In a preferred embodiment, the first and second through holes 222 and 224 are co-axial. The first and second through holes 222 and 224 are preferably formed by cutting or punching.

The first and second clip members 202 and 204 are arranged horizontally along two different directions, and each first arm portion 210 is side-by-side adjacent to at least one second arm portion 214. In a preferred embodiment, as shown in FIG. 2, the two first arm portions 210 and the two second arm portions 214 respectively extend from two opposite sides of the corresponding first and second based portions 208 and 212. In a preferred embodiment, the first and second clip members 202 and 204 are substantially band-shaped, and arranged horizontally substantially perpendicular to each other. In another preferred embodiment, the first and second base portion 208 and 212 are hexagonal-shaped, and the fastener 200 further comprises a third clip member (not shown) stacked between the second clip member 204 and the fastening element 206, wherein each two of the first, second and third clip members are positioned horizontally at a substantial 60-degree angle with respect to each other, for fastening a honeycomb-like grating panel on the support. As a result, the fastener 200 comprises a multi-layered bottom part formed by stacked base portion, which reinforces the fastener 200 when a tension load is applied thereto. In yet another preferred embodiment, each of the first and second base portions 208 and 212 is of a polygonal shape, and the two first arm portions 210 and the two second arm portions 214 respectively extend from two adjacent sides of the corresponding first and second based portions 208 and 212.

In a preferred embodiment, at least one of the first and second arm portions 210 and 214 comprises an opening 226, such that the fastening element 206 is visible through the opening 226. The opening 226 is preferably formed by punching or cutting.

Figure 3A:
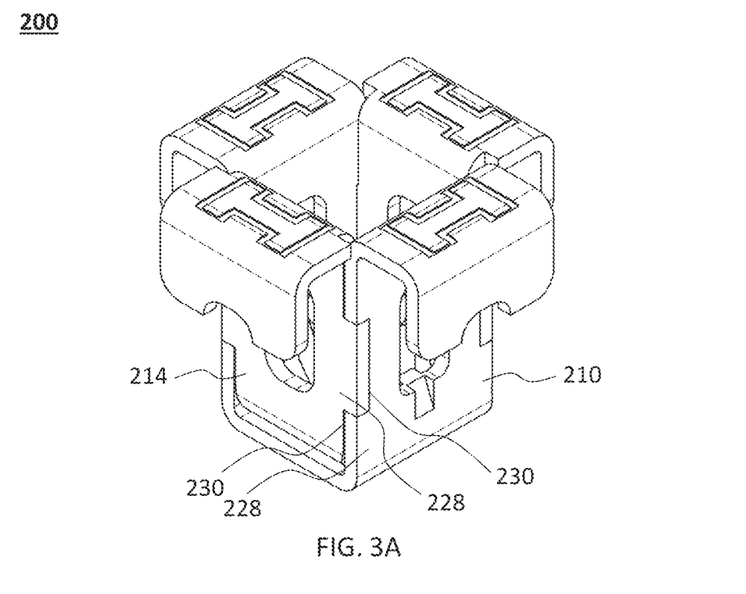
FIG. 3A is a schematic isometric view of the fastener of FIG. 2 after being assembled in accordance with an embodiment of the present invention.

FIG. 3A shows a schematic isometric view of the fastener of FIG. 2 after being assembled in accordance with an embodiment of the present invention. In a preferred embodiment, the first and second clip members 202 and 204 are interlocked with each other by tabs 228 and apertures 230 formed on adjacent sides of the adjacent first and second arm portions 210 and 214. As the example shown in FIG. 3A, the second arm portion 214 comprises a tab 228 that is received in an aperture 230 of the first arm portion 210, wherein the inner surface of the tab 228 abuts the side of the first arm portion 210, and vice versa, such that the adjacent first and second arm portions 210 and 214 support each other to prevent deformation when a shear load is applied to the fastener 200. The tabs 228 and apertures 230 are preferably formed by cutting or punching.

Figure 3B:
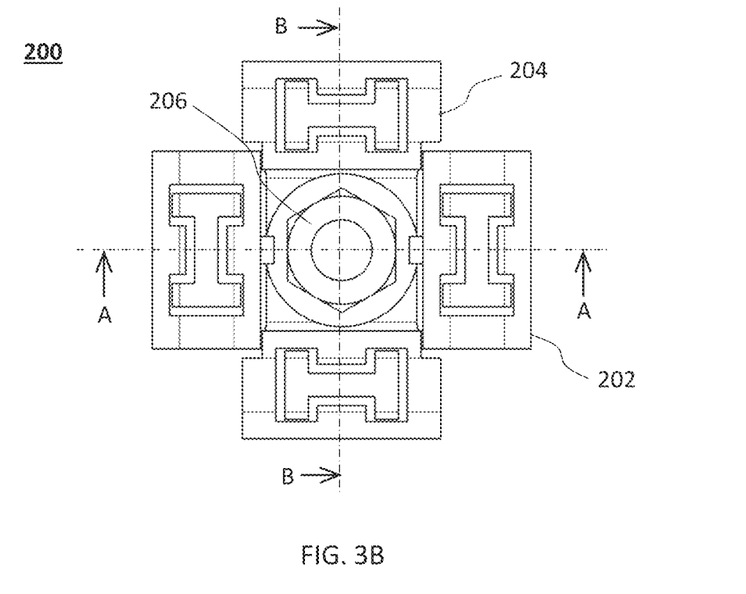
FIG. 3B is a schematic top plan view of the fastener of FIG. 3A in accordance with an embodiment of the present invention.
Figure 4A:
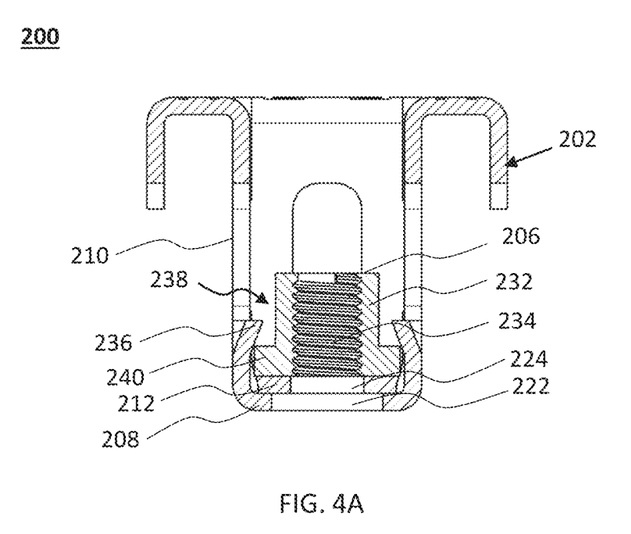
FIGS. 4A and 4B are schematic cross-sectional side views of the fastener respectively from the line A-A and line B-B of FIG. 3B in accordance with an embodiment of the present invention.
Figure 4B:
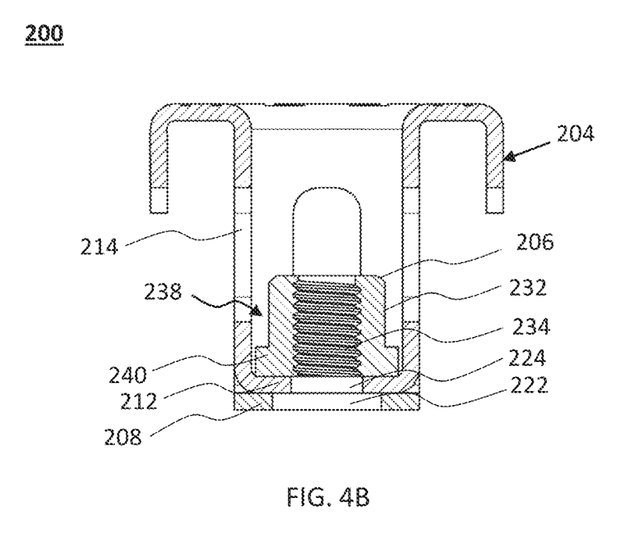

FIG. 3B is a schematic top plan view of the fastener 200 of FIG. 3A, and FIGS. 4A and 4B are cross-sectional side views of the fastener 200 respectively from the line A-A and line B-B of FIG. 3B. In a preferred embodiment, the fastening element 206 is a nut element that comprises a head portion 232 of polygonal form, for example, a hexagon, as illustrated in FIG. 2, and a screw hole 234 formed in the head portion 232, wherein the screw hole 234 is entirely exposed through the first and second through holes 222 and 224.

In a preferred embodiment, at least one protrusion 236 is formed on an inner surface of one of the first and second arm portions and extends over a part of the fastening element 206, such that the fastening element 206 can be kept within a main cavity 238 formed by the second base portion 212 and the first and second arm portions 210 and 214 without adding any extra feature thereto. In a preferred embodiment, the fastening element 206 further comprises a flange portion 240 surrounding a lower part of the head portion 232, wherein the flange portion 240 is sandwiched between the protrusion 236 and the second base portion 212, such that the fastening element 206 is locked but horizontally rotatable within the main cavity 232. The protrusion 236 is preferably formed on the inner surface of at least one of the first arm portions 210 such that the flange portion 240 of the fastening element 206 and the second base portion 212 of the second clip member 204 are both sandwiched between the protrusion 236 and the first base portion 208 of the first clip member 202. In a preferred embodiment, the protrusion 236 is partially cut out from the first arm portion 210 and bent inwardly towards the main cavity 238. In another preferred embodiment, the protrusion 236 is raised from the inner surface of the first arm portion 210 by stamping.

Figure 5:
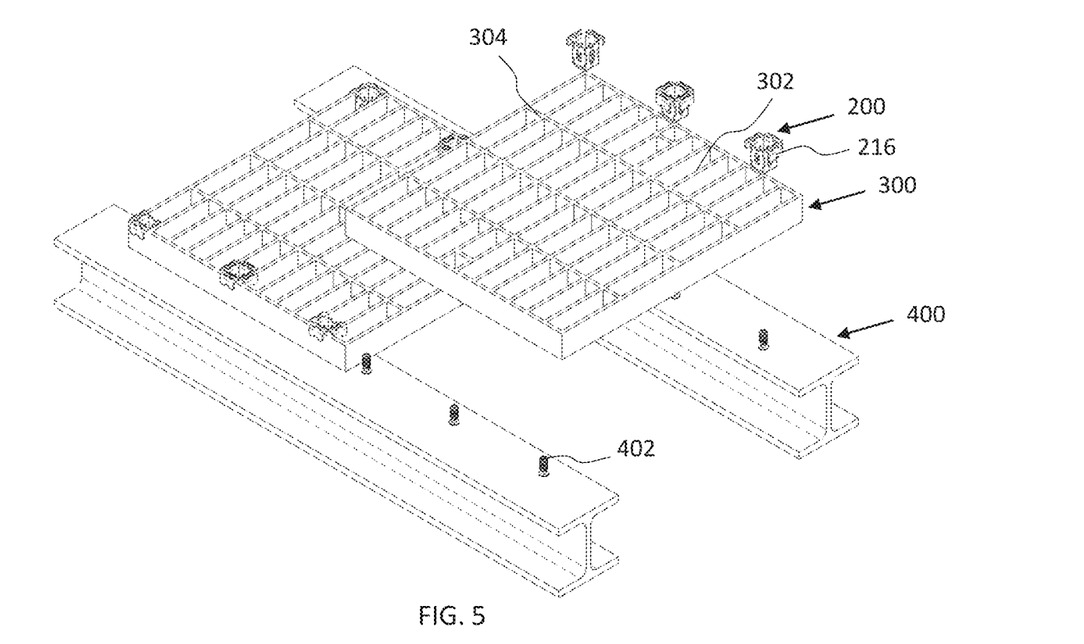
FIG. 5 is an illustrative view of fixing grating panels on supports with a plurality of fasteners of FIG. 3A in accordance with an embodiment of the present invention.

FIG. 5 is an illustrative view of fixing grating panels 300 on supports 400 with a plurality of fasteners 200. Each grating panel 300 comprises a set of first bars 302 substantially parallel to each other, and a set of second bars 304 substantially perpendicular to the set of first bars 302. The grating panel 300 is placed on the support 400, wherein the support 400 comprises a plurality of pre-installed screw elements 402 extending upwardly and positioned within gaps between adjacent bars. In a preferred embodiment, the fastener 200 can have less than four hook portions 216 depending on the location of the fastener 200 within the grating panel 300 or the distance between two adjacent second bars 304.

Figure 6:
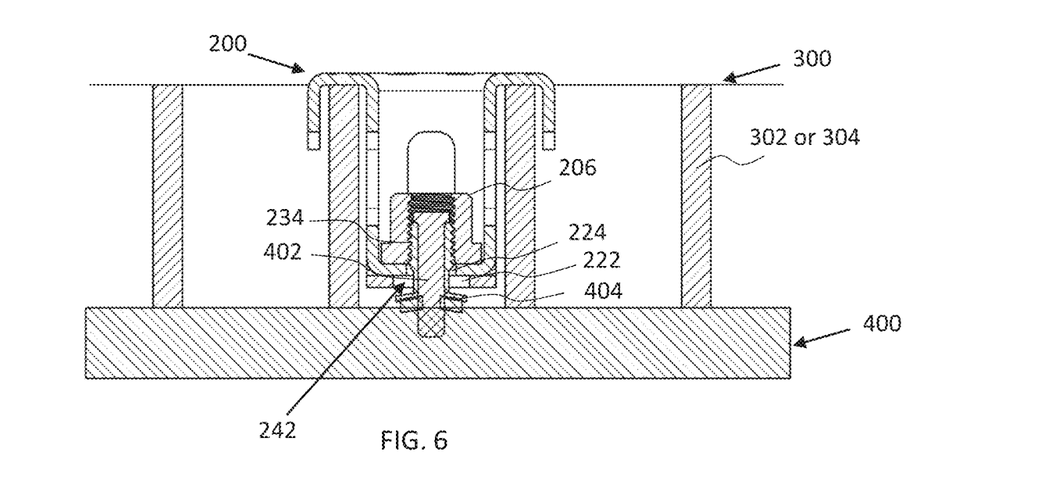
FIG. 6 is a schematic cross-sectional side view of the fastener of FIG. 4B when fixing a grating panel on a support in accordance with an embodiment of the present invention.

FIG. 6 is a schematic cross-sectional side view of the fastener 200 from the line B-B of FIG. 3B when being mounted to fix the grating panel 300 on the support 400 in accordance with an embodiment of the present invention. The screw hole 234 of the fastening element 206 is completely exposed through the first and second through holes 222 and 224 such that the pre-installed screw elements 402 can be threaded into the screw hole 234 via the first and second through holes 222 and 224. The diameter of the second through hole 224 is less than the outer diameter of the fastening element such that a bottom surface of the fastening element 206 abuts the second base portion 212 of the second clip member 204. In a preferred embodiment, the diameter of the first through hole 222 is larger than the diameter of the second through hole 224 to form a stepped bottom cavity 242 at the bottom of the fastener 200, such that the second through hole 224 with a smaller diameter provides larger contact area between the fastening element 206 and the second base portion 212, while the first through hole 222 with a larger diameter ensures no contact between the fastener 200 and a washer 404 of the screw element 402.

Figure 7A:
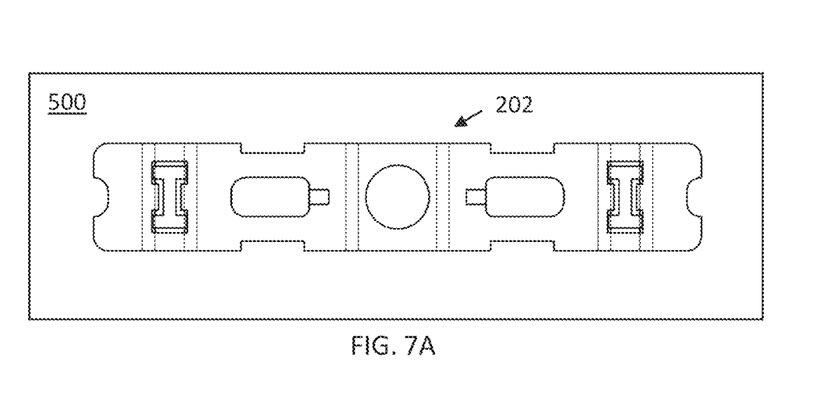
FIGS. 7A and 7B are schematic top plan views of a first and second clip members laid out in a sheet material in accordance with an embodiment of the present invention.
Figure 7B:
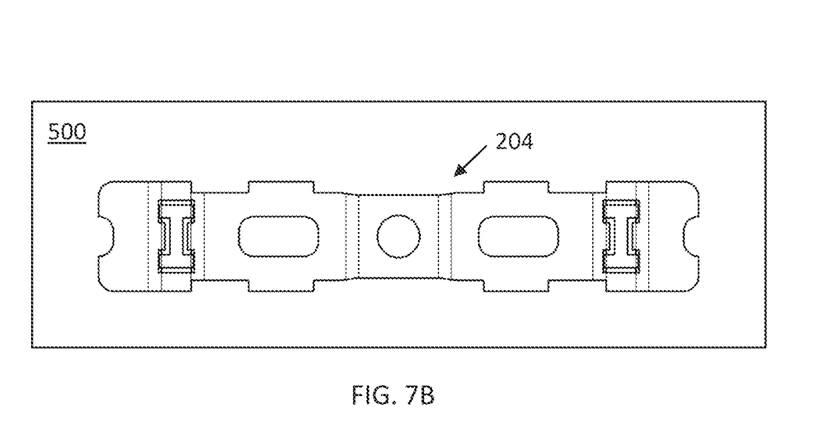

With reference to FIGS. 7A and 7B, in a preferred embodiment, the first and second clip members 202 and 204 are pre-laid out in a sheet material 500 such as metal or an alloy. The first and second clip members 202 and 204 each comprises a general band shape such that a plurality of first and second clip members 202 and 204 can be laid out in the sheet material 500 in a simple and cost-effective way. The first and second clip members 202 and 204 are formed by stamping the sheet material 500, bending the arm portions 210 and 214 upwardly, and bending or rolling to form the hook portions 216.

Figure 8:
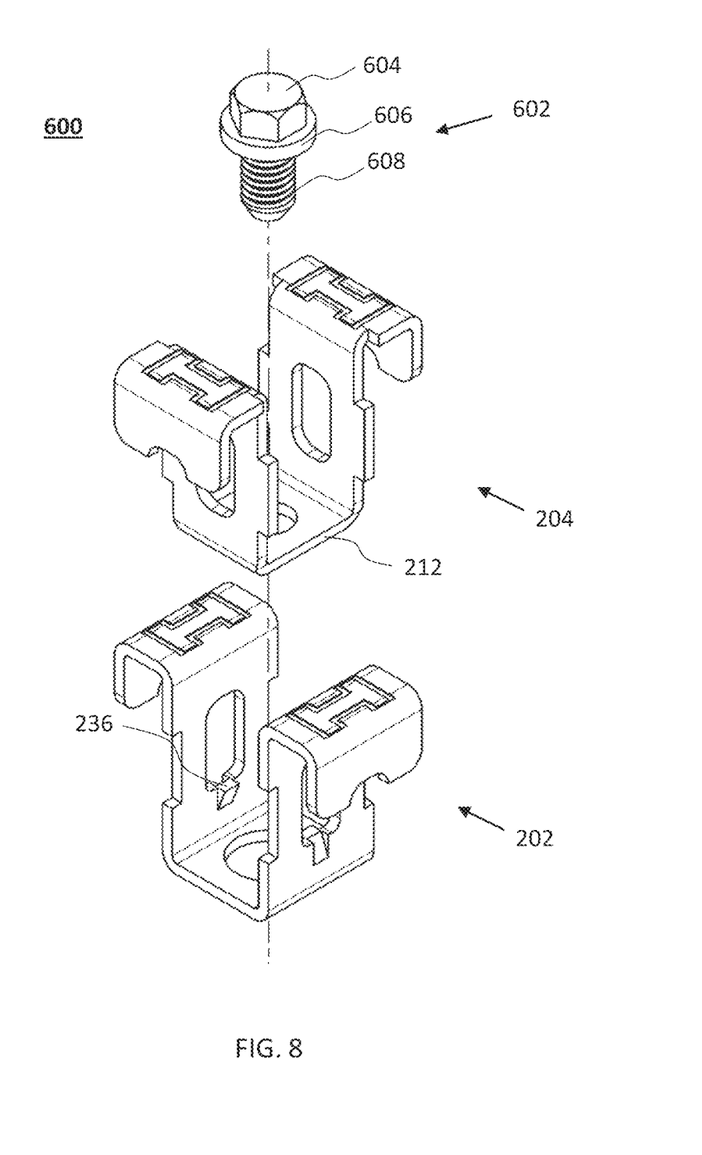
FIG. 8 is a schematic exploded, perspective view of a fastener for fixing grating panels in accordance with another embodiment of the present invention.

Referring to FIG. 8, a schematic exploded, perspective view of a fastener 600 in accordance with another embodiment of the present invention is shown. The fastener 600 is substantially same as the fastener 200 of FIG. 2 except that the fastening element 602 is a screw or a bolt that comprises a head portion 604 of polygonal form, for example, a hexagon, a flange portion 606 surrounding a lower part of the head portion 604, and a male screw portion 608, wherein similarly, after being assembled, the flange portion 606 is sandwiched between the protrusion 236 and the second base portion 212. The fastener 600 is used for fixing a grating panel on a support that comprises a plurality of holes.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A fastener, comprising:
   a first clip member, comprising a first base portion and two first arm portions that extend upwardly from two sides of the first base portion;
   a second clip member locked with the first clip member, comprising a second base portion and two second arm portions that extend upwardly from two sides of the second base portion, wherein each first arm portion is interlocked with at least one second arm portion by at least a pair of a tab and an aperture formed on adjacent sides of the first and second arm portions; and
   at least one hook portion extending from a distal end of one of the first and second arm portions,
   wherein the first and second clip members are arranged horizontally along two different directions, and the second base portion is positioned on the first base portion.

2. The fastener of claim 1, wherein the first base portion comprises a first through hole formed therein, and the second base portion comprises a second through hole formed therein, wherein the second through hole at least partially overlaps with the first through hole.

3. The fastener of claim 2, further comprising:
   a fastening element positioned on the second base portion, wherein the fastening element comprises a screw hole exposed through the first and second through holes, or comprises a male screw portion extending through the first and second through holes, and
   at least one protrusion formed on an inner surface of one of the first and second arm portions and extending over a part of the fastening element to keep the fastening element within a main cavity formed by the second base portion and the first and second arm portions.

4. The fastener of claim 2, wherein the first and second through holes are substantially coaxial and the first and second through holes each have a diameter, and the diameter of the first through hole is larger than the diameter of the second through hole.

5. The fastener of claim 1, wherein the two first arm portions extend upwardly from two opposite sides of the first base portion, and the two second arm portions extend upwardly from two opposite sides of the second base portion.

6. The fastener of claim 1, wherein the hook portion comprises at least a groove or a ridge formed on a top surface of the hook portion.

7. The fastener of claim 1, wherein at least one of the first and second arm portions comprises an opening.

8. The fastener of claim 1, wherein the first base portion comprises a first through hole formed therein, and the second base portion comprises a second through hole formed therein, wherein the second through hole at least partially overlaps with the first through hole.

9. The fastener of claim 8, further comprising:
   a fastening element positioned on the second base portion, wherein the fastening element comprises a screw hole exposed through the first and second through holes, or comprises a male screw portion extending through the first and second through holes, and
   at least one protrusion formed on an inner surface of one of the first and second arm portions and extending over a part of the fastening element to keep the fastening element within a main cavity formed by the second base portion and the first and second arm portions.

10. The fastener of claim 9, wherein the at least one protrusion is formed on the inner surface of at least one of the first arm portions.

11. The fastener of claim 10, wherein the fastening element further comprises a flange portion surrounding a lower part of a head portion, wherein the flange portion is sandwiched between the at least one protrusion and the second base portion.

12. The fastener of claim 9, wherein the fastening element further comprises a flange portion surrounding a lower part of a head portion, wherein the flange portion is sandwiched between the at least one protrusion and the second base portion.

13. The fastener of claim 9, wherein the at least one protrusion is partially cut out from the one of the first and second arm portions, and bent towards the main cavity.

14. A fastener, comprising:
   a first clip member, comprising a first base portion and two first arm portions that extend upwardly from two sides of the first base portion;
   a second clip member locked with the first clip member, comprising a second base portion and two second arm portions that extend upwardly from two sides of the second base portion wherein the first base portion comprises a first through hole formed therein, and the second base portion comprises a second through hole formed therein, wherein the second through hole at least partially overlaps with the first through hole;
   a fastening element positioned on the second base portion, wherein the fastening element comprises a screw hole exposed through the first and second through holes, or comprises a male screw portion extending through the first and second through holes, and
   at least one protrusion formed on an inner surface of one of the first and second arm portions and extending over a part of the fastening element to keep the fastening element within a main cavity formed by the second base portion and the first and second arm portions, wherein the at least one protrusion is formed on the inner surface of at least one of the first arm portions; and at least one hook portion extending from a distal end of one of the first and second arm portions, wherein the first and second clip members are arranged horizontally along two different directions, and the second base portion is positioned on the first base portion.

15. The fastener of claim 14, wherein the at least one protrusion is partially cut out from the first arm portion, and bent towards the main cavity.

16. The fastener of claim 14, wherein the fastening element further comprises a flange portion surrounding a lower part of a head portion, wherein the flange portion is sandwiched between the at least one protrusion and the second base portion.

17. The fastener of claim 14, wherein the at least one protrusion is partially cut out from the one of the first and second arm portions, and bent towards the main cavity.

18. A fastener, comprising:
a first clip member, comprising a first base portion and two first arm portions that extend upwardly from two sides of the first base portion;
a second clip member locked with the first clip member, comprising a second base portion and two second arm portions that extend upwardly from two sides of the second base portion wherein the first base portion comprises a first through hole formed therein, and the second base portion comprises a second through hole formed therein, wherein the second through hole at least partially overlaps with the first through hole;
a fastening element positioned on the second base portion, wherein the fastening element comprises a screw hole exposed through the first and second through holes, or comprises a male screw portion extending through the first and second through holes, and
at least one protrusion formed on an inner surface of one of the first and second arm portions and extending over a part of the fastening element to keep the fastening element within a main cavity formed by the second base portion and the first and second arm portions, wherein the fastening element further comprises a flange portion surrounding a lower part of a head portion, wherein the flange portion is sandwiched between the at least one protrusion and the second base portion; and
at least one hook portion extending from a distal end of one of the first and second arm portions,
wherein the first and second clip members are arranged horizontally along two different directions, and the second base portion is positioned on the first base portion.

19. The fastener of claim 18, wherein the at least one protrusion is partially cut out from the one of the first and second arm portions, and bent towards the main cavity.

* * * * *